United States Patent
Bhatt et al.

(10) Patent No.: US 8,077,182 B2
(45) Date of Patent: Dec. 13, 2011

(54) USER INTERFACE CONTROLS FOR MANAGING CONTENT ATTRIBUTES

(75) Inventors: Nikhil Bhatt, Cupertino, CA (US); Blake Seely, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 880 days.

(21) Appl. No.: 12/050,124

(22) Filed: Mar. 17, 2008

(65) Prior Publication Data

US 2009/0231352 A1    Sep. 17, 2009

(51) Int. Cl.
| | |
|---|---|
| G09G 5/00 | (2006.01) |
| G06K 9/40 | (2006.01) |
| G06K 9/60 | (2006.01) |
| G06F 17/00 | (2006.01) |
| G06F 3/048 | (2006.01) |
| G06F 7/00 | (2006.01) |

(52) U.S. Cl. ........ 345/581; 345/619; 345/661; 345/184; 382/254; 382/305; 707/705; 707/805; 715/200; 715/275; 715/764; 715/974

(58) Field of Classification Search ............ 345/581, 345/589, 619, 661, 156, 184; 382/254, 274, 382/276, 305; 707/667, 674, 705, 805; 715/200, 715/273, 275, 700, 764–765, 856, 968, 974, 715/961
See application file for complete search history.

(56) References Cited

U.S. PATENT DOCUMENTS

| | | | | |
|---|---|---|---|---|
| 5,600,833 | A * | 2/1997 | Senn et al. ............................ 1/1 |
| 5,802,361 | A * | 9/1998 | Wang et al. .................. 382/217 |
| 6,074,677 | A * | 6/2000 | Croft ............................ 426/124 |
| 6,151,610 | A * | 11/2000 | Senn et al. .................... 715/236 |
| 2005/0198559 | A1 * | 9/2005 | Fujiwara ....................... 715/500 |

* cited by examiner

*Primary Examiner* — Wesner Sajous
(74) *Attorney, Agent, or Firm* — Fish & Richardson P.C.

(57) ABSTRACT

A computer-implemented method includes displaying a content item having at least one attribute that is changeable in value, maintaining a history of image states, each image state in the history corresponding to a change in at least one attribute value relative to another image state, and based on the maintained history of image states, generating multiple modified image states such that a quantity of modified image states is different from a quantity of image states in the maintained history.

45 Claims, 7 Drawing Sheets

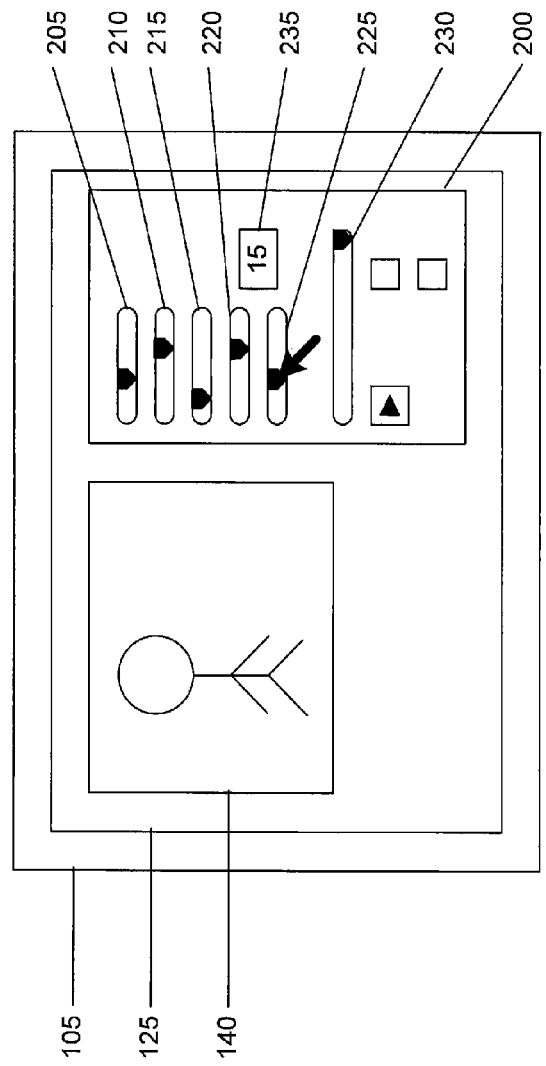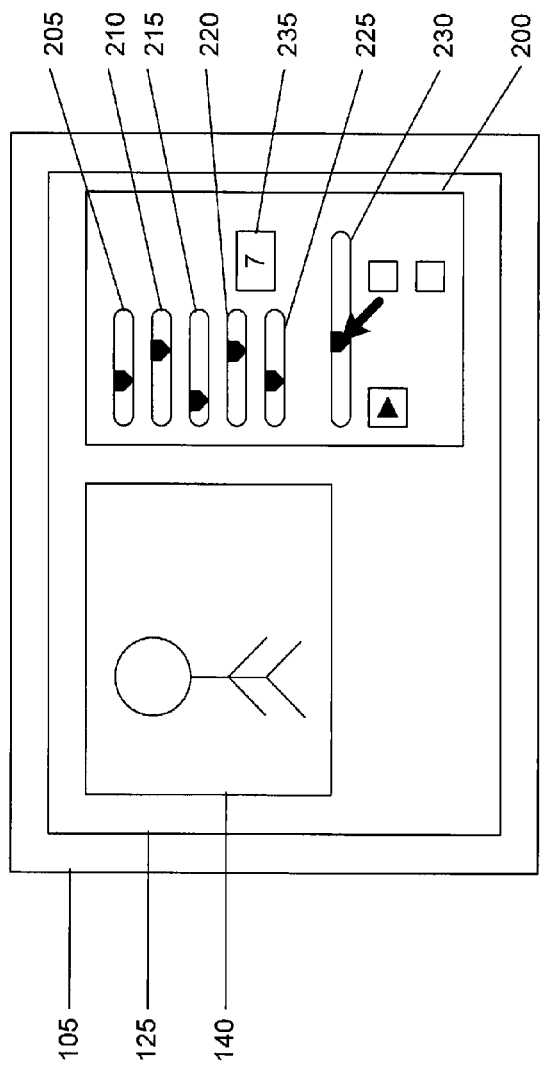

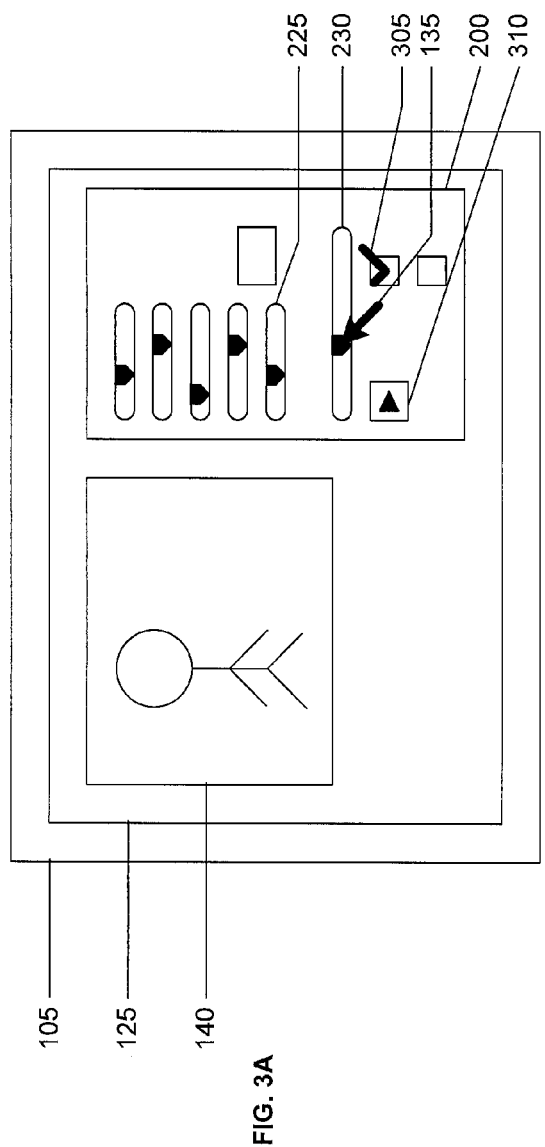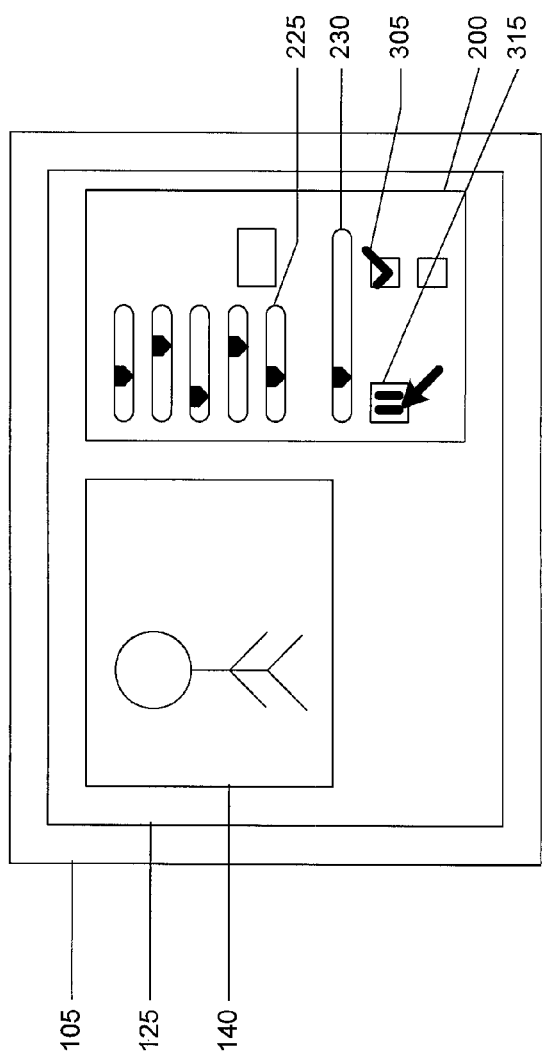
FIG. 3A
FIG. 3B

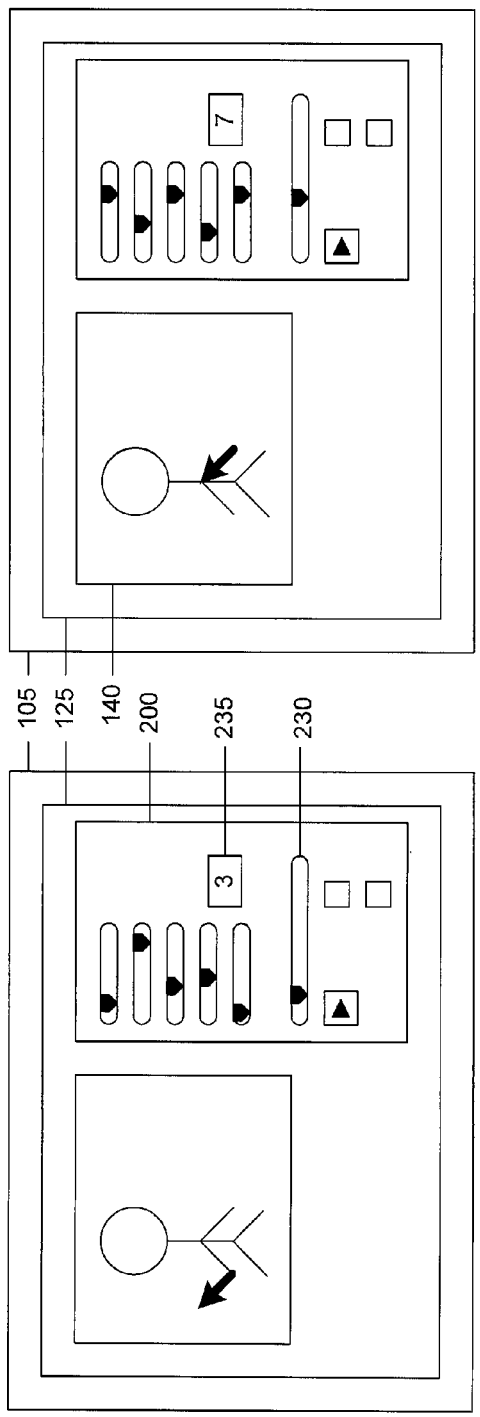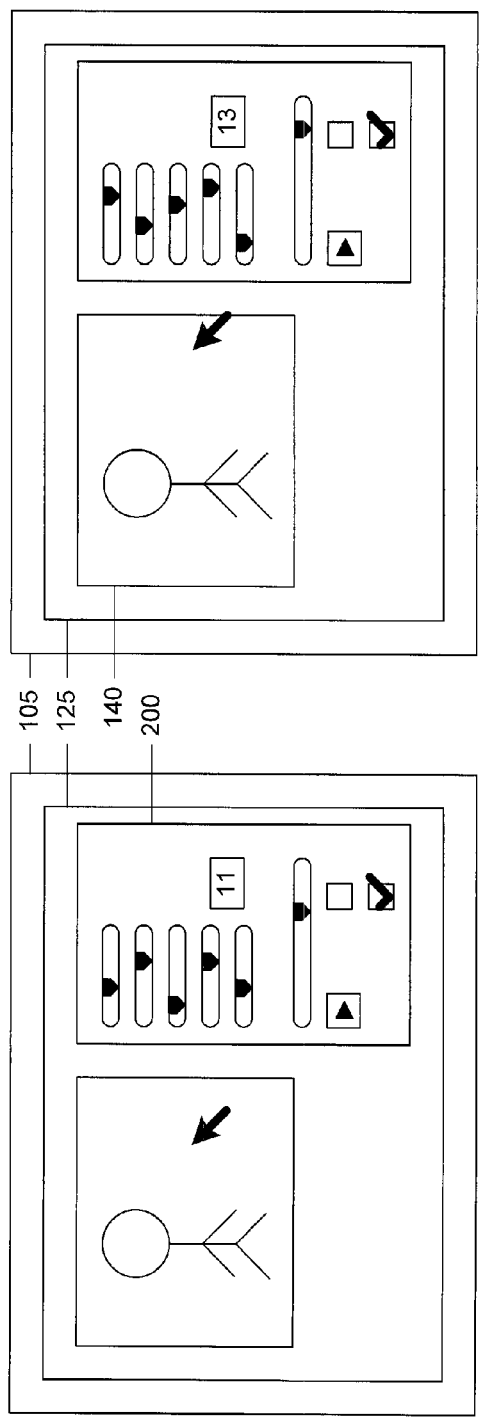

USER INTERFACE CONTROLS FOR MANAGING CONTENT ATTRIBUTES

TECHNICAL FIELD

The present disclosure relates to software applications for editing content items such as images, video, audio, and the like.

BACKGROUND

Software applications can edit content items such as images, video, audio, documents, and the like, that are captured using devices, e.g., digital cameras, stored as images files, e.g., in JPG format, and transferred to storage devices. The software applications can retrieve an image file stored in a storage device and display the image file in a display device of a computer system. An image can be displayed according to one or more changeable attributes, e.g., sharpness, brightness, color, and the like, where each attribute can be assigned an attribute value. Users can change how an image appears by changing an attribute value corresponding to an attribute related to the image using user interface controls offered by software applications. In general, the set of particular attribute values used to display an image can be treated as an "image state." If a change is made to one or more of the attribute values, a new image state results.

SUMMARY

This specification describes technologies relating to user interface controls for managing content attributes.

In general, one aspect of the subject matter described in this specification can be implemented in methods that include displaying a content item having at least one attribute that is changeable in value, maintaining a history of image states, each image state in the history corresponding to a change in at least one attribute value relative to another image state, and based on the maintained history of image states, generating a plurality of modified image states such that a quantity of modified image states is different from a quantity of image states in the maintained history. Other implementations of this aspect include corresponding systems, apparatus, and computer program products.

This, and other aspects, can include one or more of the following features. The method of claim can further include storing the maintained history of image states and the modified image states in a computer-readable memory. The method can further include, in response to receiving input, displaying the content item according to an image state retrieved from the maintained history of image states, wherein the content item is displayed according to attribute values corresponding to the retrieved image state, receiving input to change at least one of the attribute values corresponding to the retrieved image state, and erasing the states that are stored in the maintained history of image states subsequent to the retrieved image state, from the computer-readable memory. The input can include skimming. The method can further include displaying a user interface control related to the image states in the history of image states in the user interface, the user interface control configured to display the content item according to the attribute values corresponding to one of the image states of the history of image states in response to receiving input, wherein the content item is displayed according to attribute values corresponding to the image state according to which the content item is displayed. The method of can further include displaying a user interface control panel in the user interface, the user interface control panel including an attribute user interface control configured to change a value of at least one of the attribute values in response to an attribute input, and receiving a plurality of attribute inputs, one attribute input after another, to the attribute user interface control, each attribute input assigning a new value to a corresponding attribute value of the changeable attribute, each attribute input creating a new image state, wherein every time the new image state is created, the user interface control is updated to reflect the creating. Updating the user interface control to reflect the creating can include adding a visual representation to the user interface control indicating the new image state. The user interface control can be a slider including a button located within the slider, the button configured to be located at a plurality of positions within the slider, wherein each position of the button in the slider corresponds to an image state. The plurality of modified image states is greater than the image states in the maintained history of image states, and wherein the plurality of modified image states is obtained by interpolating values corresponding to the image states of the maintained history of image states. The method can further include updating the user interface control such that each position in the updated user interface control corresponds to one of the plurality of modified image states. The user interface further can include a play control button configured such that, when the play control button is selected, the content item is successively displayed in the user interface according to the plurality of modified states, starting from a modified state and proceeding towards a last modified state. The plurality of modified states can be fewer than the image states in the maintained history of image states, and wherein the plurality of modified states includes image states obtained based on factors including an assignment. The assignment can be based one or more of a duration for which a content item is viewed or a selection of an image state from the maintained history of image states. The content item can be an image and the changeable attribute includes one of a brightness, a sharpness, a hue, and a saturation. The changeable attribute can have a default image state corresponding to a default value, the content item displayed according to the default image state when the content item is first displayed in the display device.

Particular implementations of the subject matter described in this specification can be implemented to realize one or more of the following advantages. Displaying a user interface control that relates to multiple image states of a content item can enable a user to track each image state and a number of changes that have been made to the content item. Storing the multiple image states can enable retrieving any image state and displaying the content item according to the attribute value corresponding to the retrieved image state. In some examples, modified image states can be generated based on the multiple image states of a content item where the multiple modified image states are greater in number than the stored image states. Because each image state corresponds to an attribute value assigned to the content item, increasing the number of image states enables displaying the content item according to more attribute values than the user originally assigned to the content item. In other examples, the number of image states can be decreased to create abridged image states, where the abridged image states correspond to attribute values that are more representative of the content item. The user can be provided with the most relevant image states corresponding to the most representative attribute values, thereby simplifying the choice of values.

The details of one or more implementations are set forth in the accompanying drawings and the description below. Other features, aspects, and advantages will become apparent from the description, the drawings, and the claims.

BRIEF DESCRIPTION OF THE DRAWINGS

FIGS. 2A-2D are schematics of examples of a user interface including an image and a user interface control panel to change image states of the image.

FIGS. 3A and 3B are schematics of examples of a user interface including an image and a user interface control panel to change image states of the image.

FIGS. 5A-5D are schematics of examples of a user interface where the image is displayed according to states by skimming.

Like reference numbers and designations in the various drawings indicate like elements.

DETAILED DESCRIPTION

Figure 1:
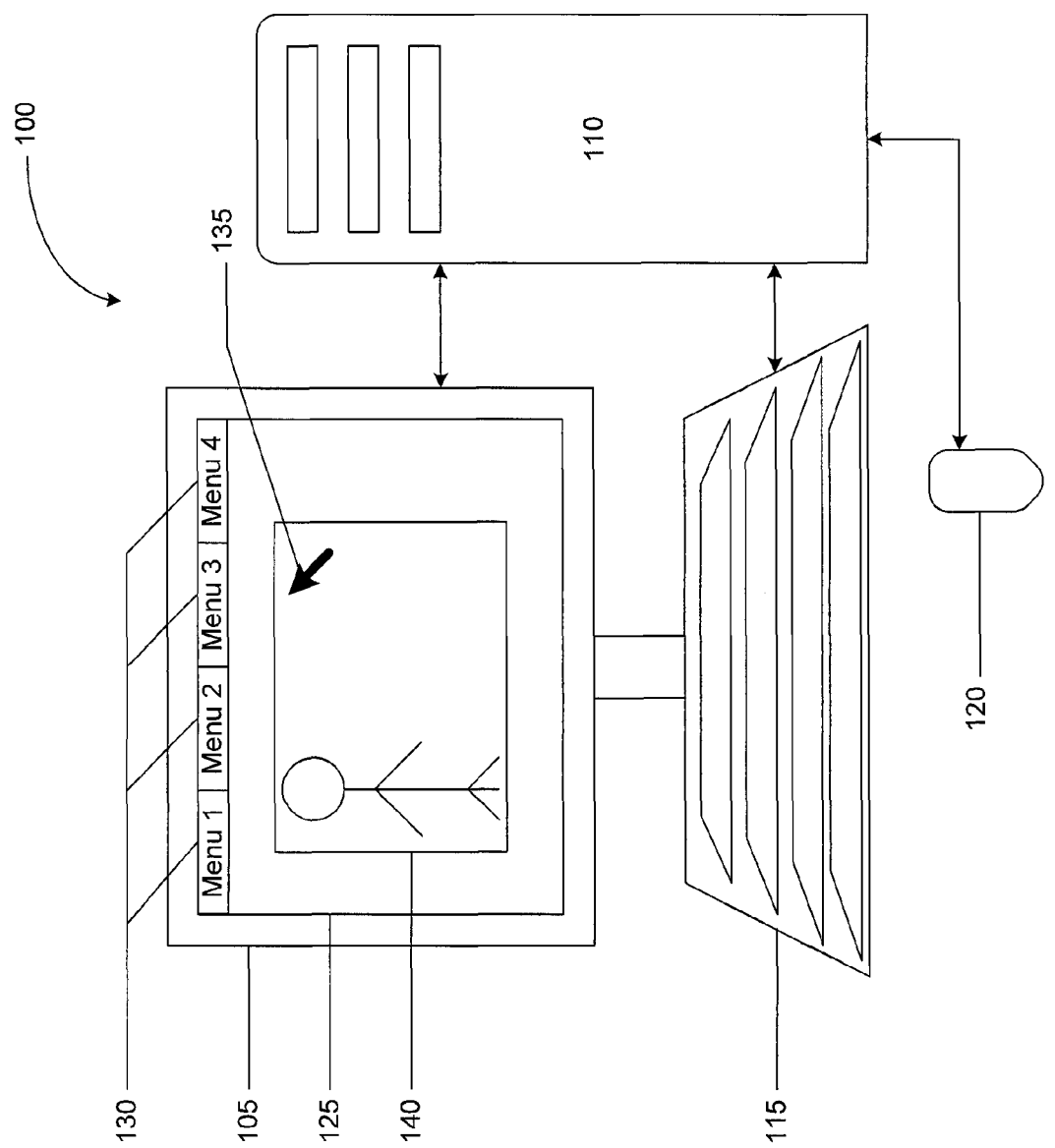
FIG. 1 is a schematic of an example of a system for editing content items.

The present disclosure describes features of software applications configured to enable viewing of and performing editing operations on content items, e.g., images. The editing operations can include viewing images on a display device according to several image attributes such as brightness, sharpness, color, hue, and the like. In addition, the editing operations can include enabling a user to generate an image state of an image based on one or more attributes applied to the image, either individually or simultaneously in a batch including two or more attributes. The software application can be configured to provide the user with user interface controls that control the attribute values. Further, the editing operations can include tracking and maintaining a history of image states by storing attribute values that are applied to the image, as well as generating modified image states based on the tracked states to provide the user with modified image states that are greater or fewer in number than originally created image states based on the user's modification choice. The modified image states can be provided in addition to the maintained history of image states such that a user can access the maintained history at any time during editing.

The present disclosure describes some implementations where image states that represent attribute values assigned to an image are tracked, stored, and smoothened, in response to receiving input from a user, where the smoothening results in a number of modified image states that is greater in number than the originally created image states. In such implementations, when the image is first displayed in the display device, the image is assigned default attribute values and displayed according to a default image state. For example, the image can have a default sharpness, a default brightness, a default hue, and the like. When the user alters an image attribute using a user interface control, the image is placed in a new image state. The user can alter the attribute values, one attribute at a time, as many times as the user chooses or alter attribute values of more than one attribute simultaneously, e.g., a batch alteration. Every time the user changes an attribute value, the image is placed in a new image state, and displayed according to a set of attribute values that correspond to the new image state. The default attribute values corresponding to the default image state are stored and the new image state can be provided as an addition to the default image state. This enables the user to access the default image state at any time during editing. In implementations where the user alters the attribute values of a batch of attributes simultaneously, a new image state is created in response to the batch alteration and the image is displayed according to the new attribute values of the attributes in the batch. The software application is configured to store each set of attribute values, thereby storing multiple image states, where the multiple image states are stored as discrete values. In response to a user selection, the software application can modify the multiple stored image states and create multiple modified image states where the modified image states represent continuous attribute values obtained by modifying the attribute values corresponding to the discrete image states. In this manner, the software application can smoothen the stored discrete attribute values to create continuous attribute values. This leads to an increase in the number of attribute values, and correspondingly, in the number of modified image states. Further, the software application can be configured to enable displaying the image according to any one of the modified image states created by smoothening the discrete image states.

The present disclosure also describes some implementations where the image states are tracked, stored, and abridged, in response to receiving input from a user, where a number of modified image states created by abridging is less than a number of image states that were originally created. In such implementations, the user changes the default image state several times and, in the process, creates several new image states. Because the user is presented with several attribute values corresponding to the several new image states, the user may have difficulty in managing the image states. The software application can be configured to alleviate this difficulty by abridging the several image states, thereby decreasing the number of image states to a more manageable number. Although several image states are abridged to present the user with a manageable number of image states, the original image states and the corresponding attribute values are stored so that the user can access the original image states at any time during editing. The abridged image states are provided in addition to the original image states. In some methods of abridging, some of the stored image states can be retained while others are not. The image states that are retained during abridging can be chosen based on several factors such as the time spent by the user viewing the image after assigning an attribute value. If the user spent a period of time viewing the image that is, e.g., greater than a threshold duration, the software application can conclude that the user may have preferred the appearance of the image, and can consequently retain the image state during abridging. The present disclosure describes some factors for abridging image states. Other factors will become will become apparent from the description that follows and the associated figures.

FIG. 1 depicts a schematic of an example of a system 100 for editing content items. The system 100 can be any computer system such as a desktop computer, laptop computer, personal digital assistant (PDA), and the like. The system 100 includes a display device 105 operatively coupled to a processing unit 110. In addition, the system 100 includes input devices, such as a keyboard 115 and a pointing device 120, e.g., a mouse, a stylus, and the like, operatively coupled to the processing unit 110. A user can provide input using the keyboard 115 and the pointing device 120, and view the outcome of the input in the display device 105. For example, the system 100 can include an LCD monitor operatively coupled to a central processing unit. A mouse and a keyboard can also be coupled to the central processing unit.

The processing unit 110 is configured to receive a computer program product tangibly embodied in a computer-readable medium, e.g., a CD-ROM. The computer program product includes instructions to cause the processing unit 110 to perform operations. For example, the processing unit 110 can include a CD-ROM drive to receive the CD-ROM. The CD-ROM can be an installation disk that includes instructions corresponding to a software application that enables editing and management of content items, e.g., images, video, audio, documents, and the like. The instructions in the computer program product cause the processing unit 110 to provide a user with a user interface 125 that allows the user to edit and manage content items, e.g., images. In some implementations, the images are stored in storage media, e.g., a hard disk, operatively coupled to the processing unit 110. To enable a user to edit and manage content, the user interface 125 is displayed in the display device 105.

In some implementations, upon installing the software application in the processing unit 110, an icon corresponding to the application is displayed in the display device 105. In response to a user selecting the icon, e.g., using the pointing device 120, the user interface 125 is displayed in the display device 105. Alternatively, a selectable object corresponding to the software application can be selected from a menu of selectable objects. The user interface 125 includes several menu items 130, e.g., Menu 1, Menu 2, Menu 3, Menu 4, where each menu item 130 includes one or more selectable objects. The selectable objects can be configured to cause the processing unit 110 to perform different operations on content items including opening operations for displaying and editing the items, editing operations, storing operations, and the like. For example, a first selectable object can be configured to enable a user to access content items stored in a storage device. A second selectable object can be configured to enable a user to save a content item in a storage device. In this manner, selectable objects can be configured to perform an operation in response to a selection.

In some implementations, a cursor 135 controlled by the pointing device 120 can be displayed in the display device 105. A menu item 130 can be selected by positioning the cursor 135 over a menu item 130 and clicking a mouse button and/or using a keystroke. Selecting the menu item 130 can cause a menu of selectable objects to be displayed, where each selectable object corresponds to an operation. The cursor 130 can be positioned on a selectable object and the object can be selected to cause the processing unit 110 to perform the corresponding operation. For example, a user can position the cursor 135 over a menu item 130, e.g., titled "File," and select the menu item by clicking the mouse. In response, a list of selectable objects can be displayed. The selectable objects can include objects such as "Open," "Save," "Save As," and the like.

Alternatively, or in addition, the keyboard 115 can be used to access the menu items 130. One or more keys on the keyboard 115 can be configured such that, in response to a keystroke, the selectable objects of a menu item 130 are displayed. A user can navigate the selectable objects displayed in a menu item 130 using additional keys, e.g., arrow keys, on the keyboard 115 and select an object, e.g., using the "Enter" key on the keyboard 115. In some implementations, the menu items 130 can be accessed using a combination of keys on the keyboard 115 and the cursor 135.

Selecting an object in the menu item 130 can cause the processing unit 110 to display a user interface control panel in the user interface 125. The user interface control panel can include one or more attribute user interface controls that can be selected to edit content. In some implementations, to display the user interface control panel, the user first selects a menu item 130 that causes a list of selectable objects in the menu item 130 to be displayed in the user interface 125. Subsequently, the user selects an object in the menu item 130 that causes a corresponding user interface control panel to be displayed. For example, the menu item 130 can be titled "Photos," and can include a selectable object titled "Show Photo Info." A user can select "Show Photo Info" to cause a user interface control panel to be displayed. In other implementations, a key or a combination of keys on the keyboard 115 can be configured to cause the display of a user interface control panel corresponding to an object in the menu item 130. In such implementations, when the user selects the key or combination of keys corresponding to a user interface control panel, the panel is automatically displayed in the user interface 125. The instructions in the computer program product can include default keys and/or key combinations corresponding to user interface control panels. Alternatively, or in addition, a user can configure keys and/or key combinations to correspond to user interface control panels.

A content item, e.g., an image 140, is displayed in the user interface 125 in response to user input. For example, the user can access a storage device where content items are stored, and select an image 140. In response, the image 140 can be displayed in the user interface 125. To change the attributes of the image 140, the user selects objects in the menu items 130 causing the user interface control panel to be displayed. The user can use the attribute user interface controls in the user interface control panel to change the attributes of the image 140.

Figure 2A:
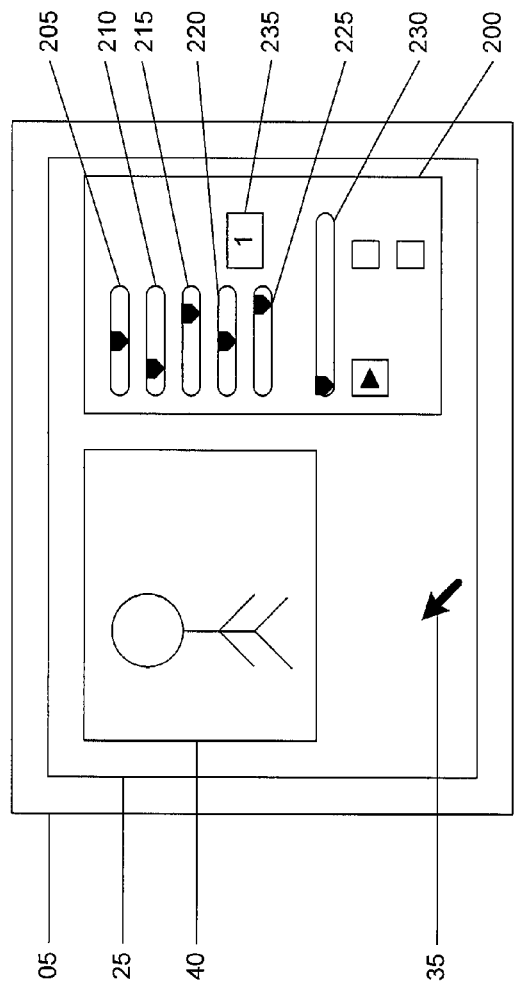
Figure 2B:
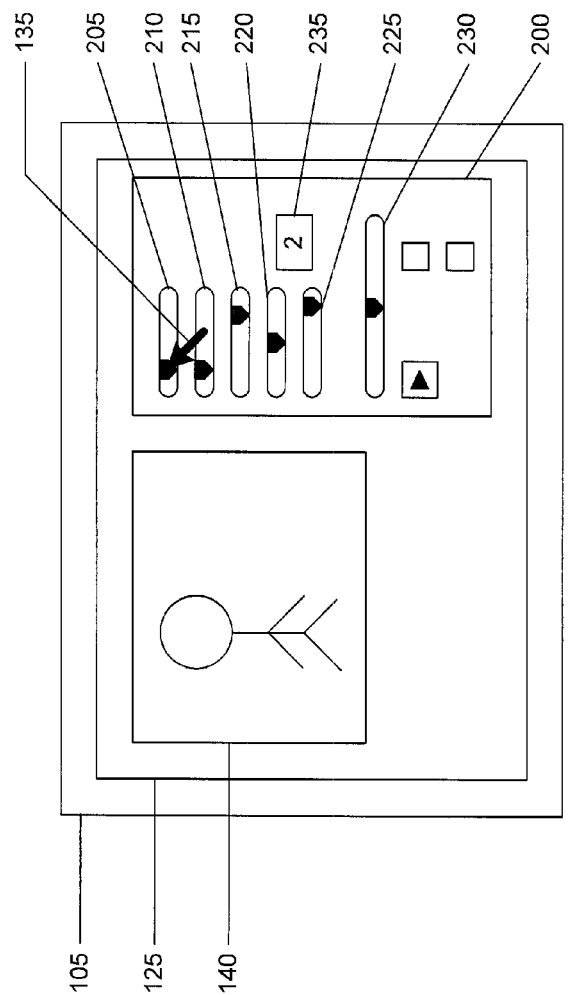

FIGS. 2A-2D depict schematics of examples of a user interface including an image 140 and a user interface control panel 200 to enable changing attributes of the image 140. As illustrated in FIG. 2A, in response to user input, a user interface control panel 200, including attribute user interface controls 205, 210, 215, 220, and 225, is displayed in the user interface 125 to enable editing the image 140. For example, when a user selects a key on the keyboard 115 or selects, e.g., a menu item in the user interface 125, the user interface control panel 140 can be displayed. In some implementations, an area occupied by the user interface control panel 200 can overlap an area occupied by the image 140. In other implementations, the image 140 can be automatically re-sized and the user interface control panel 200 can be displayed within a region of the user interface 125 such that the image area and the user interface control panel area do not overlap each other.

In some implementations, the attribute user interface controls 205, 210, 215, 220, and 225 are displayed as sliders, where each slider includes a button within the area enclosed by the corresponding slider. Each attribute user interface control corresponds to an attribute of the image and is configured to enable changing the attribute. The image 140 is initially displayed in the display device in a default image state. When the user changes an attribute of the image, the image state is changed from the default image state to a new image state, and the image 140 is displayed according to the new image state. For example, control 205 can be configured to change brightness of the image 140, control 210 to change saturation, control 215 to change sharpness, and so on. Each attribute has a corresponding attribute value which is related to a position of the button within the slider. When a user moves the button within a slider, the attribute value of the corresponding attribute changes. In some implementations, the attribute value of an attribute can range between 0 and 99. Based on the position of the button at the left end or the right end of the slider, the attribute value can be 0 or 99, respectively. A user can change the attribute value using the attribute user interface control 205 by positioning the cursor over the button of the slider corresponding to the attribute user interface control 205, selecting the button, and moving the button to a different location within the slider. In response, the image 140 can be updated to reflect the changed attribute. Although the attribute user interface controls 205, 210, 220, and 225 are illustrated as sliders with buttons, the controls can be implemented in other forms including text boxes, drop-down boxes, and combinations thereof. Further, additional attribute user interface controls that are configured to perform functions in addition to changing image attributes can be included in the user interface control panel 200.

The image 140 can have several attributes including sharpness, brightness, contrast, hue, and the like. The combination of image attributes according to which an image is displayed represent an image state of the image. Each attribute user interface control can correspond to an attribute and each attribute can have a default attribute value. When the image 140 is first displayed in the user interface 125, the image 140 can be displayed according to the default attribute values. When the user moves a button in a slider, e.g., the slider of the attribute user interface control 205, the attribute value is changed, a new attribute value is assigned to the image 140, and a new image state is created. The default image state and the new image state can be stored in a computer-readable memory. Every time an attribute value is changed to a new value, using any of the attribute user interface controls, the new image state that is created can be stored along with the previously stored image states.

For example, the attribute user interface control 205 can be configured to change the brightness of the image 140. The brightness of the image can be changed from the default value corresponding to the default image state and a first new brightness value corresponding to a first new image state can be assigned to the image 140 by changing the position of the button in the slider control 205. Subsequently, the brightness of the image can be changed from the first new brightness value to a second new brightness value, thereby changing the image state from the first new image state to a second new image state. The default image state, the first new image state, and the second new image state can be stored in a computer-readable memory.

In another example, a default brightness value can be changed and a new brightness value can be assigned to the image 140, thereby creating a new image state. Subsequently, a default sharpness value can be changed and a new sharpness value can be assigned to the image 140, thereby creating a second new image state. The default image state and both new image states can be stored in the computer-readable memory. In this manner, several attribute values can be assigned to the image 140, and the image state corresponding to each attribute value can be stored.

In some implementations, the user interface control panel 200 can include an attribute counter 235 (FIG. 2B) configured to display a number of times the image states have been changed. For example, when the image 140 is displayed in the user interface 125 according to the default image state, the attribute counter 235 can display 1. When an attribute value is changed and a new image state is created, the attribute counter 235 can be updated to display 2. In addition, the image 140 can be displayed according to the attribute values corresponding to the new image state. Similarly, for each change in attribute value that leads to a creation of an image state, the display of the attribute counter 235 can be incremented by 1.

In some implementations, multiple image states can be assigned to the image 140 in response to receiving corresponding inputs. The user interface control panel 200 can include a image state user interface control 230 which is related to the multiple image states assigned to the image 140. For example, the image state user interface control 230 can represent each image state that is assigned to the image 140, including the default image state. If the attribute value of the image 140 was changed 10 times, then the image state user interface control 230 can include 10 positions that represent the default image state and the 9 new image states.

As illustrated in FIGS. 2A-2D, the user interface control 230 can be a slider with a button. If the attribute value of the image 140 has been changed from the default value to a new attribute value once, then two image states are stored in the computer-readable memory, namely the default image state and the newly created image state. For example, two positions are created in the slider corresponding to the image state control 230, where each position corresponds to one of the two stored image states. For example, the left end and the right end of the slider can correspond to the default image state and the newly created image state, respectively. Positioning the button of the slider in the left end will cause the image 140 to be displayed according to the attribute values corresponding to the default image state. Similarly, positioning the button at the right end of the slider will cause the image 140 to be displayed according to the attribute values corresponding to the new image state. A user can position the button of the slider at a desired location within the slider using the keyboard 115 or the pointing device 120 or both. To position the button at the left end of the slider, the user can position the cursor 135 on the button and drag the button to the left end. Alternatively, the user can position the cursor 135 at a location adjacent to the left end of the slider and select the location. In response, the button is automatically positioned at the left end of the slider. The user can position the button at the right end of the slider by similar operations.

A user can change the same attribute value several times using the same user interface control, e.g., control 205. Alternatively, or in addition, the user can change different attribute values of the image 140 using corresponding user interface controls, e.g., controls 205, 210, 215, and the like. For example, the control 205 can be configured to assign a new brightness attribute. The user can assign several new brightness attribute values of the image 140 by repeatedly moving the button of the slider corresponding to control 205. A new image state can be created in response to each change of the brightness value, where each new image state corresponds to image attributes including each new brightness value. Further, the default image state and each new image state can be recorded. Alternatively, the user can assign a new brightness attribute value once, a new sharpness attribute value once, a new hue attribute value once, and so on, and create a new image state with each change. Each new image state that is created is stored, e.g., in an array of image states. For each new image state that is created, a corresponding position can be created for the button within the slider of the user interface control 230. For example, if 5 new image states are assigned to the image 140, 5 positions corresponding to 5 image states can be created for the button of the slider of control 230. The first position (position 1) can be the left end of the slider and can correspond to the default image state. The fifth position (position 5) can be the right end of the slider and can correspond to the $5^{th}$ image state. The intermediate positions (position 2-position 4) can be located equidistantly within the width of the slider. When a user moves the button of the slider between, e.g., position 2 and position 3, and releases the button, based on the proximity of the button to either position 2 or position 3, the button can automatically be positioned at either position 2 or position 3. When the button is located at a particular position, the image 140 is displayed in the user interface 125 according to the attributes of the image state to which the position corresponds.

FIG. 2C illustrates an example of a user interface 125 including a user interface control panel 200 where the attribute counter 235 displays 15, indicating that 15 image states are stored. Consequently, the image state user interface control 230 has 15 positions where the button of the slider can be positioned such that the 15 positions correspond to 15 image states. The user can move the button to any one of the 15 positions and, in response, the image 140 can be displayed according to the attribute values of the image state corresponding to the position. For example, as illustrated in FIG. 2C, the button is positioned at the right end of the slider, the image 140 is displayed according to the attribute values of the most recently created image state, and the attribute counter 235 displays 15.

FIG. 2D illustrates an example of a user interface 125 including a user interface control panel 200, where the image 140 has 15 stored image states. The slider corresponding to image state control 230 has 15 positions. As illustrated in FIG. 2D, the button of the slider corresponding to the control 230 is moved to the 7$^{th}$ position in the slider. In response to the moving, the attribute counter 235 displays 7. The attribute values corresponding to the image state of the 7$^{th}$ position are retrieved from the computer-readable memory and the image 140 is displayed according to the retrieved image state.

In addition to storing the image states, the positions of the buttons on the sliders corresponding to the controls 205-225 that represent the attribute values of the image corresponding to a stored image state are also recorded. When a user positions the button of the slider corresponding to image state control 230 at the 7$^{th}$ position, the attribute values corresponding to that image state are determined and the buttons on the sliders corresponding to controls 205-225 are automatically positioned at locations within the controls 205-225 that correspond to the retrieved attribute values. When the user moves the button of the slider of image state control 230 to a new position, the positions of the buttons of the sliders of controls 205-225 are also updated. Upon retrieving a stored image state, a user can change one of the attribute values corresponding to the retrieved image state using one of the attribute user interface controls 205-225. For example, the user can move the button of the slider corresponding to the attribute user interface control 220. This creates a new image state that is stored. Also, the image states corresponding to positions 7-15 of the slider, that were previously stored, are automatically erased from the computer-readable memory.

For example, a user can have assigned 15 new attribute values to the image 140. Consequently, the slider of the image state control 230 can include 15 positions, where each position corresponds to an image state. The user can position the button of the slider of image state control 230 at the 7$^{th}$ position. In response, the image 140 can be displayed according to the 7$^{th}$ image state. Also, the buttons of the sliders of controls 205-225 can be positioned at locations that correspond to the respective attribute values of the 7$^{th}$ position of the slider of control 230. If a user changes the position of the button of one of the sliders of controls 205-225, a new image state (image state 8) is created and the new image state is stored. Further, image states 9-15 are automatically erased from the computer-readable memory. In this manner, image states are stored in a sequence, and creating a new image state in the middle of the sequence causes subsequent image states to be erased from the sequence and to be replaced by the new image state.

FIGS. 3A and 3B depict schematics of examples of user interfaces where new image states an image 140 are created in response to input to by modifying image states assigned to the content item, where a number of modified image states is greater than a number of image states that were assigned to the content item. In some implementations, the user interface control panel 200 includes a smoothening input control 305, which can be selected using the keyboard 115 or the pointing device 120 or both. In response to the selection, an identification mark, e.g., a check mark, can be displayed in the smoothening input control 305.

When the attribute values related to the image 140 are changed, the number of stored image states is equal to the number of times the attribute values were changed. Thus, if the attribute user interface controls were used to change the attribute values 5 times, then 5 image states are stored in the computer-readable memory. Each stored image state is discrete. In response to detecting the smoothening input control 305, the attribute values corresponding to the stored image states can be modified from discrete values to continuous values where the number of continuous values is greater than the number of discrete values. For example, attribute values corresponding to consecutively stored image states can be interpolated, e.g., by linear interpolation, to obtain intermediate attribute values corresponding to modified image states. In other implementations, the interpolation schemes can be non-linear and/or a combination of linear and non-linear interpolation schemes. In this manner, the stored image states that are created by assigning attribute values to the image 140 can be smoothened to create modified image states where the discrete attribute values of the stored image states are modified into continuous attribute values of the modified image states.

For example, if 5 image states are stored in the computer-readable memory, and the smoothening input control 305 is selected, intermediate attribute values can be obtained by interpolating the attribute values corresponding to any two image states of the 5 image states (e.g., values 1 and 2, 2 and 3, 3 and 4, 4 and 5) and a modified image state can be created. Alternatively, attribute values corresponding to every two consecutive image states can be interpolated to obtain intermediate attribute values corresponding to the modified image states. As the image states are smoothened and intermediate attribute values obtained, all positions within the slider corresponding to the image state user interface control 230 can be associated with at least one of the smoothened image states. Consequently, positioning the button of the slider of the control 230 at any location within the slider can cause the image 140 to be displayed according to a corresponding smoothened image state obtained by, e.g., interpolating the stored attribute values. A user can position the cursor 135 on the button of the slider of the image state control 230 and move the button to any position within the slider. Since the attribute values are continuous, the movement of the button within the slider is smooth and all positions of the button within the slider have a corresponding image state.

As illustrated in FIG. 3A, the user interface control panel includes a play control button 310 configured to cause the button in the slider to behave as a playhead. When the play control button 310 is selected, using either the keyboard 115 or the pointing device 120 or both, the button in the slider is moved from the current location within the slider towards the right end of the slider. In some examples, the button can be positioned at the left end of the slider. As the button moves from the left end to the right end, the image 140 is updated according to the smoothened image state associated with each position of the button within the slider. Once the play control button 305 is selected, the play control button 310 is replaced by a pause control button 315 (FIG. 3B). When the button in the slider moves to the right end of the slider, image updating stops and the pause control button 315 is replaced by the play control button 310. Further, when the pause control button 315 is selected while the button in the slider is moving, the button stops moving in the slider, and the image updating is paused. The pause control button 315 is replaced by the play control button 310 and the image 140 is displayed according to the image state associated with the position where the button in the slider is stopped.

Further, the user can position the button at any location in the slider of the image state control 230 and alter the image attributes using the attribute user interface controls 205-225. The user can select the smoothening input control 305 using the cursor 135 or a key on the keyboard 115 or both to disable smoothening. In response, the check mark in the smoothening input control 305 can be hidden from display. If the user has not changed any of the modified attribute values, then the stored attribute values are restored. In some implementations, if the user assigns a new attribute value, e.g., by changing the attribute values using the attribute user interface controls while the smoothening input control 305, is selected, then the stored attribute values are restored. The smoothening input control 305 can be automatically disabled and the new attribute value can be stored along with the default attribute values.

Figure 4:
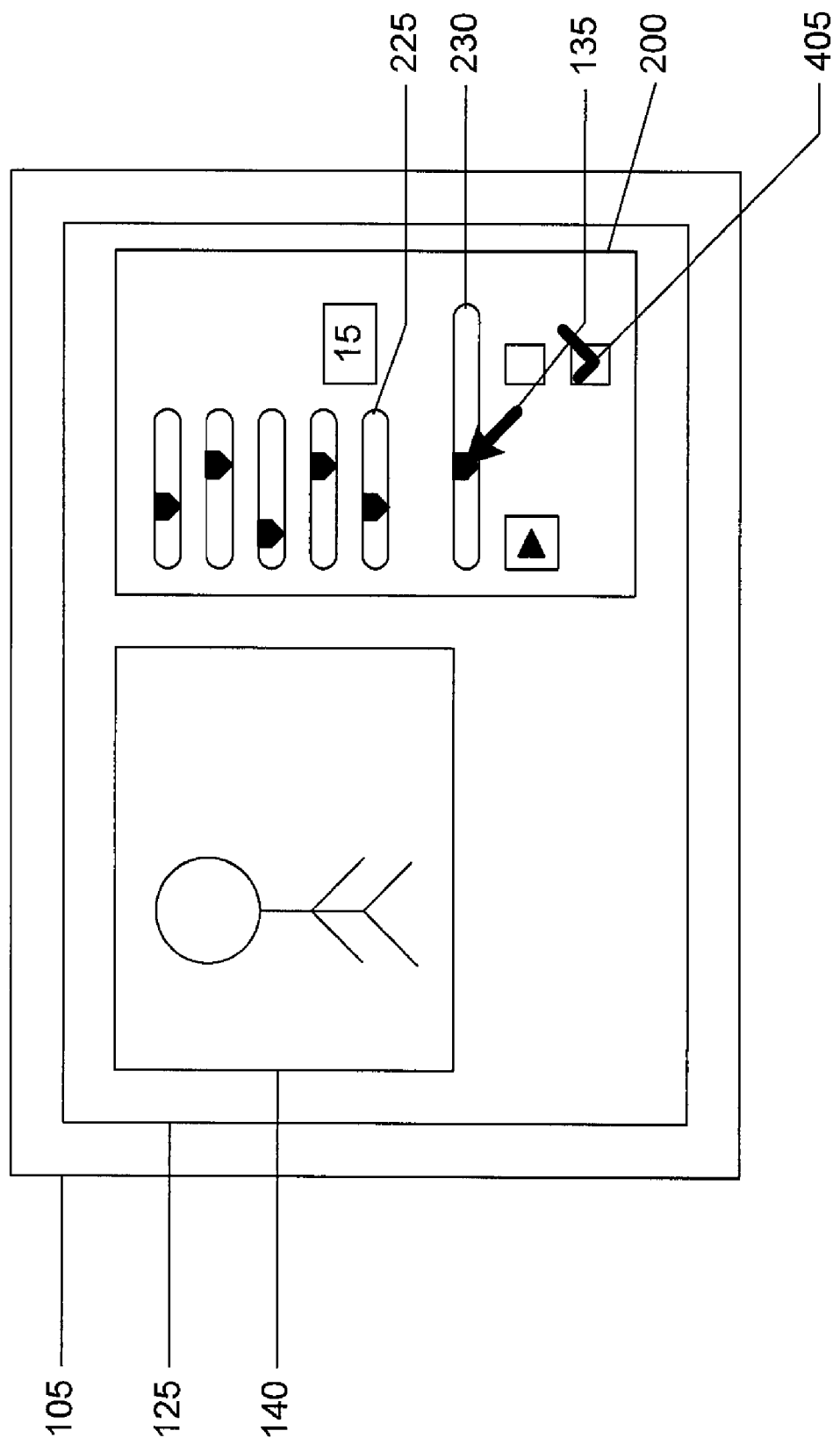
FIG. 4 is a schematic of an example of a user interface including an image and a user interface control panel to change image states of the image.

FIG. 4 depicts a schematic of an example of a user interface for modifying the multiple image states of the image 140 to obtain modified image states where the number of modified image states is lesser than the number of image states that were originally created. In some implementations, the user interface control panel 200 can include an abridging input control 405 which can be selected using the keyboard 115 or the pointing device 120 or both. For example, the cursor 135 can be positioned on the abridging input control 405 and the pointing device 120, e.g., can be clicked to select the control 405. In response to the selection, an indicator, e.g., a check mark, can be displayed in the control 405. New attribute values can be obtained based on the stored attribute values that correspond to the stored image states in response to the selection of the control 405, and the image states can be abridged. The stored image states can be abridged and modified image states can be obtained by methods such as assigning one or more of the image states to be modified attribute values. The assigning can be automatic or user-defined based on factors including a duration for which the user views an image after assigning an attribute value, the last attribute value assigned before viewing a new image, the last attribute value assigned before closing the software application, and the like. In some implementations, assigning can be in response to certain commands, e.g., lift/stamp commands for batch alteration and/or other major commands, e.g., switching RAW decode versions.

For example, the user can change the attribute values of an image 140 7 times. This causes 7 image states to be created and stored as stored image states. The duration between creating a $2^{nd}$ image state and the 3 image state maybe greater than a threshold duration, e.g., 2 seconds. When the user selects the abridged input control 405, one of the modified image states can correspond to attribute values of be the $2^{nd}$ stored image state because the user spent, e.g., more than 2 seconds viewing the image 140 after modifying the $2^{nd}$ image state to the $3^{rd}$ image state. Similarly, modified image states can be determined based on the time spent viewing an image. In other examples, a user can specify one or more of the created and stored image states to be modified image states. In this manner, the user can be provided with an modified set of image states that are fewer in number than the originally created set of image states and are representative of the image states that were originally created.

FIGS. 5A-5D depict schematics of examples of a user interface where the image is displayed according to image states by skimming. In the examples shown in FIGS. 5A-5D, the image 140 is assigned 15 image states and the attribute values corresponding to each image state is stored. In some implementations, the area occupied by the image 140 is divided vertically into a number of regions equal to the number of stored image states. Each region corresponds to one of the stored image states such that when the cursor is positioned over a region, the image 140 is displayed according to the image state to which the region corresponds. For example, FIG. 5A depicts that the cursor is positioned near the left edge of the image 140. The region where the cursor is positioned corresponds to the $3^{rd}$ image state that was created. The image 140 is displayed according to the $3^{rd}$ attribute values corresponding to the $3^{rd}$ image state. The button in the slider corresponding to the image state user interface control 230 is positioned at the $3^{rd}$ position and the attribute counter displays 3.

As illustrated in FIG. 5B, the cursor is moved to the right of the image 140 and positioned over a region corresponding to the $7^{th}$ image state. The image 140 is displayed according to the attribute values corresponding to the $7^{th}$ image state, the button in the slider of the user interface control 230 is positioned at the $7^{th}$ position, and the attribute counter 235 displays 7. Similarly, as illustrated in FIGS. 5C and 5D, when the cursor is positioned over regions corresponding to the $11^{th}$ and $13^{th}$ created image states, then the image 140 is displayed according to the attribute values corresponding to the $11^{th}$ and $13^{th}$ image states. Every time a new image state is created, the entire region occupied by the image 140 is divided by the total number of image states and an additional region is associated with the new image state. When image states are erased, then the corresponding regions are also erased. Thus, during skimming, the user scans the cursor across the image 140 from left to right, and in response to different cursor positions on the image 140, the image 140 is displayed according to the attribute values corresponding to the image states that were created.

Figure 6:
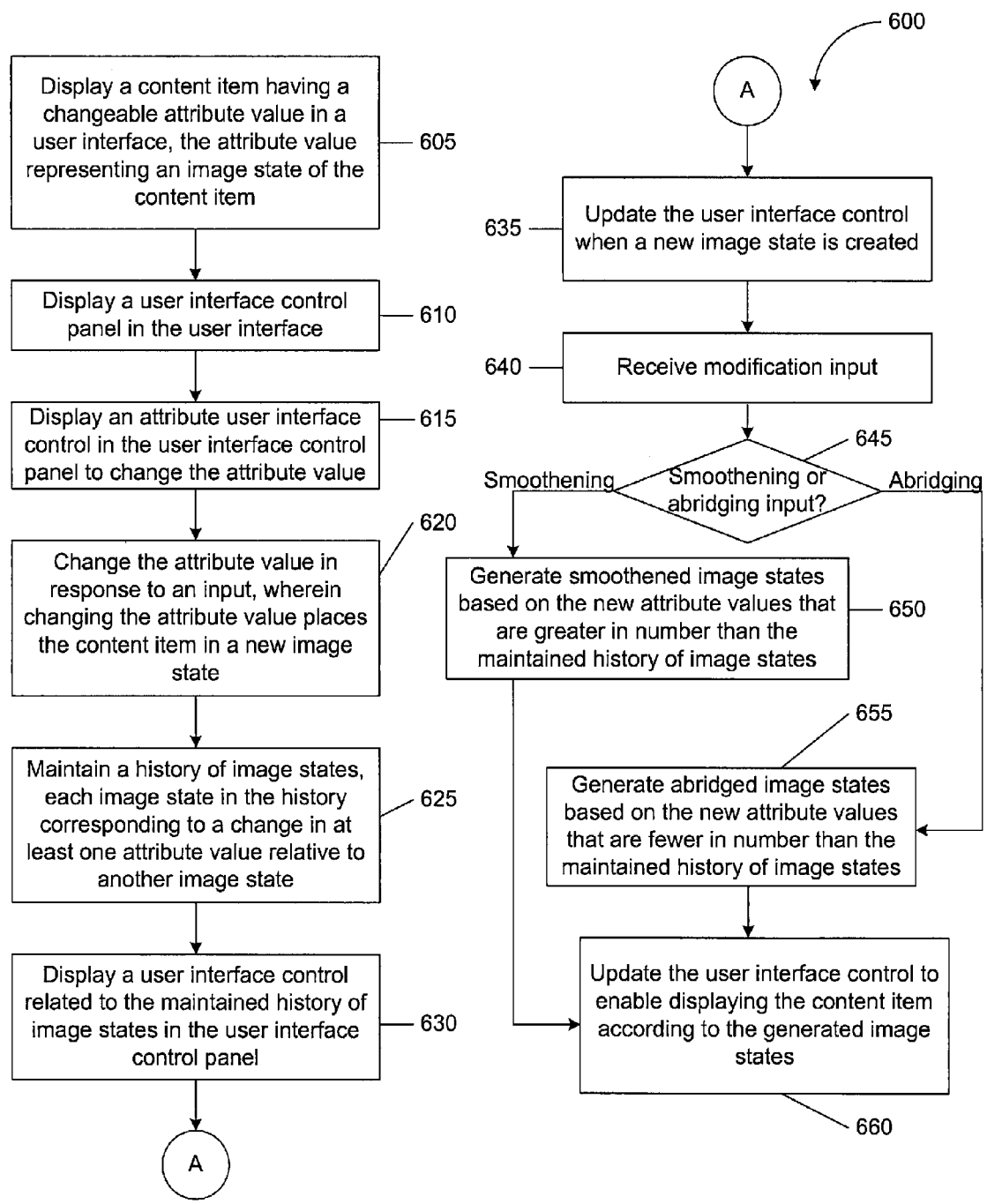
FIG. 6 is a flow chart of an example of a process for managing user interface controls that are configured to change image states of an image.

FIG. 6 depicts a flow chart of an example of a process 600 for managing user interface controls configured to change attributes of content items. The process 600 can display a content item having a changeable attribute value in a user interface at 605. The content item displayed according to an attribute value represents an image state of the content item. For example, a software application installed in a computer system can offer the user interface which can displayed in a display device in response to input. A content item, e.g., an image, can be retrieved from a storage device operatively coupled to the computer system and displayed in the user interface. The content item can be displayed according to several attributes where each attribute has a changeable attribute value.

The process 600 can display a user interface control panel in the user interface at 610. For example, the software application can be configured to cause a user interface control panel to be displayed in the user interface in response to receiving a selection. The cursor can be a selection of a menu item displayed in the user interface or a keystroke or a combination thereof.

The process 600 can display an attribute user interface control in the user interface control panel to change the attribute value according to which the content item is displayed at 615. For example, the software application can be configured to display one or more attribute user interface controls, e.g., a slider with a button within the area enclosed by the slider, in the user interface control panel. Each attribute user interface control can be configured to vary an attribute value of an attribute of the image. For example, each position of the button within the slider can correspond to an attribute value such that the user can vary the attribute value by moving the button within the slider.

The process 600 can change the attribute value in response to an input at 620. Changing the attribute value of the content item places the content item in a new image state. Every time an attribute value of an attribute is changed, the content item is placed in a new image state. For example, every time an attribute user interface control is used to change an attribute value, a new attribute value can be assigned to the content item in the user interface, the content item can be displayed according to the new attribute value, and a new image state of the content item can be created where the new image state corresponds to the new attribute value assigned to the image.

The process 600 can maintain a history of image states at 625. Each image state in the history corresponds to a change in at least one attribute value relative to another image state. For example, when the content item is first displayed in the display device, the software application displays the content item according to default attribute values assigned to the attributes of the content item. When a change is made to one of the default attribute values, the content item is placed in a new image state that is different from the default image state because the attribute values corresponding to the new image state are different from the default attribute values. The software application can maintain a history of image states by storing the image states, e.g., sequentially, in a computer-readable memory.

The process 600 can display a user interface control related to the maintained history of image states in the user interface control panel at 630. For example, the software application can be configured to display the user interface control as a slider with a button. The slider can include several positions where each position can be associated with one of the image states in the maintained history. Positioning the button of the slider on any one of the positions can cause the image to be displayed according to the image state corresponding to the position of the button.

The process 600 can update the user interface control when a new image state is created at 635. For example, the process 600 can detect that a new attribute value has been assigned to the image when the user changes an attribute value of the image using one of the attribute user interface controls. The process 600 can create a new image state corresponding to the new attribute value and include the new image state to the previously stored history of image states. The process 600 can add a position to the slider corresponding to the user interface control and automatically position the button of the slider at the newly added position. Further, the process 600 can enable a user to move the button from the newly added position to one of the other positions on the slider that correspond to one of the previously created image states.

The process can receive a modification input at 640. For example, the user interface control panel can include controls corresponding to modification inputs, such as smoothening input and abridging input. The process 600 can detect that a user has selected one of the modification input controls. For example, the software application can be configured such that the smoothening input and the abridging input is an input to increase and decrease, respectively, the number of image states in the maintained history of image states.

The process 600 can detect whether the input is a smoothening input or an abridging input at 645. For example, the process 600 can detect if the user has selected a smoothening input control or an abridging input control, where both input controls are included in the user interface control panel.

If the input is a smoothening input, the process 600 can generate new attribute values based on the image states in the history to generate smoothened image states that are greater in number than the maintained history of image states at 650. For example, the process 600 can store the attribute values corresponding to each image state in the maintained history in a sequence. To obtain smoothened attribute values, the process 600 can generate new attribute values, e.g., by interpolating attribute values corresponding to consecutive image states in the sequence. Further, the process 600 can extend the sequence of image states from a set of discrete values to continuous values. In this manner, modified image states that are greater in number than the number of image states in the history of maintained image states are created based on the image states in the history.

If the input is an abridging input, the process 600 can generate new attribute values based on the image states in the history to generated abridged image states that are fewer in number than the maintained history of image states at 655. For example, the process 600 can store each of the new attribute values in a sequence. To obtain abridged attribute values, the process 600 can rely on an assignment, where the assignment can be based on factors including a selection by a user, a duration between changing attribute values, the last attribute value that was assigned to the image, and the like. In this manner, the process 600 can create new image states that are fewer in number than the number of image states in the history by creating modified image states based on the image states in the history.

The process 600 can update the user interface control to enable displaying the content item according to the generated image state at 660. In implementations where the modification input is a smoothening input, the slider corresponding to the user interface control can be modified such that the button can be positioned at any location within the slider. In implementations where the modification input is an abridging input, the slider corresponding to the user interface control can be modified such that the button can be positioned only at positions corresponding to the abridged attribute values.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-tactile, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results. In some implementations, the content item can be a video file, an audio file, a document, and the like. In some implementations, the content item can be stored at a remote location, e.g., in a storage device operatively coupled to a server. The user interface can be displayed in a browser of a client operatively coupled to the server via one or more networks. The content item editing and user interface control managing operations can be performed over the one or more networks.

In some implementations, the play control button can cause the button in the slider from one discrete point to a subsequent discrete point representing consecutive image states. The image states in such implementations can correspond to the multiple image states in the maintained history. Alternatively, the image states can correspond to the multiple image states obtained by abridging.

In some implementations, an abridging input can be detected and in response, abridged image states can be generated. Subsequently, a smoothening input can be detected and in response, the abridged image states can be smoothened, e.g., by interpolating consecutive abridged image states. In this manner, abridging and smoothening can be performed in combination.

What is claimed is:

1. A method performed by one or more processes executing on a computer system, the method comprising:
    displaying a content item having at least one attribute that is changeable in value;
    maintaining a history of image states, each image state in the history corresponding to a change in at least one attribute value relative to another image state; and
    based on the maintained history of image states, generating a plurality of modified image states such that a quantity of modified image states is different from a quantity of image states in the maintained history.

2. The method of claim 1, further comprising storing the maintained history of image states and the modified image states in a computer-readable memory.

3. The method of claim 2, further comprising:
    in response to receiving input, displaying the content item according to an image state retrieved from the maintained history of image states, wherein the content item is displayed according to attribute values corresponding to the retrieved image state;
    receiving input to change at least one of the attribute values corresponding to the retrieved image state; and
    erasing the states that are stored in the maintained history of image states subsequent to the retrieved image state, from the computer-readable memory.

4. The method of claim 3, wherein the input comprises skimming.

5. The method of claim 1, further comprising displaying a user interface control related to the image states in the history of image states in the user interface, the user interface control configured to display the content item according to the attribute values corresponding to one of the image states of the history of image states in response to receiving input, wherein the content item is displayed according to attribute values corresponding to the image state according to which the content item is displayed.

6. The method of claim 5, further comprising:
    displaying a user interface control panel in the user interface, the user interface control panel including an attribute user interface control configured to change a value of at least one of the attribute values in response to an attribute input; and
    receiving a plurality of attribute inputs, one attribute input after another, to the attribute user interface control, each attribute input assigning a new value to a corresponding attribute value of the changeable attribute, each attribute input creating a new image state, wherein every time the new image state is created, the user interface control is updated to reflect the creating.

7. The method of claim 6, wherein updating the user interface control to reflect the creating comprises adding a visual representation to the user interface control indicating the new image state.

8. The method of claim 5, wherein the user interface control is a slider including a button located within the slider, the button configured to be located at a plurality of positions within the slider, wherein each position of the button in the slider corresponds to an image state.

9. The method of claim 1, wherein the plurality of modified image states is greater than the image states in the maintained history of image states, and wherein the plurality of modified image states is obtained by interpolating values corresponding to the image states of the maintained history of image states.

10. The method of claim 9, further comprising updating the user interface control such that each position in the updated user interface control corresponds to one of the plurality of modified image states.

11. The method of claim 10, wherein the user interface further comprises a play control button configured such that, when the play control button is selected, the content item is successively displayed in the user interface according to the plurality of modified states, starting from a modified state and proceeding towards a last modified state.

12. The method of claim 1, wherein the plurality of modified states is fewer than the image states in the maintained history of image states, and wherein the plurality of modified states includes image states obtained based on factors including an assignment.

13. The method of claim 12, wherein the assignment is based one or more of a duration for which a content item is viewed or a selection of an image state from the maintained history of image states.

14. The method of claim 1, wherein the content item is an image and the changeable attribute includes one of a brightness, a sharpness, a hue, and a saturation.

15. The method of claim 1, wherein the changeable attribute has a default image state corresponding to a default value, the content item displayed according to the default image state when the content item is first displayed in the display device.

16. A computer program product, tangibly embodied on a non-transitory computer-readable medium, the computer program product comprising instructions to enable data processing apparatus to perform operations comprising:
    displaying a content item having at least one attribute that is changeable in value;
    maintaining a history of image states, each image state in the history corresponding to a change in at least one attribute value relative to another image state; and
    based on the maintained history of image states, generating a plurality of modified image states such that a quantity of modified image states is different from a quantity of image states in the maintained history.

17. The computer program product of claim 16, the operations further comprising storing the maintained history of image states and the modified image states in a computer-readable memory.

18. The computer program product of claim 17, the operations further comprising:
    in response to receiving input, displaying the content item according to an image state retrieved from the maintained history of image states, wherein the content item is displayed according to attribute values corresponding to the retrieved image state;

receiving input to change at least one of the attribute values corresponding to the retrieved image state; and erasing the states that are stored in the maintained history of image states subsequent to the retrieved image state, from the computer-readable memory.

19. The computer program product of claim 18, wherein the input comprises skimming.

20. The computer program product of claim 16, the operations further comprising displaying a user interface control related to the image states in the history of image states in the user interface, the user interface control configured to display the content item according to the attribute values corresponding to one of the image states of the history of image states in response to receiving input, wherein the content item is displayed according to attribute values corresponding to the image state according to which the content item is displayed.

21. The computer program product of claim 20, the operations further comprising:

displaying a user interface control panel in the user interface, the user interface control panel including an attribute user interface control configured to change a value of at least one of the attribute values in response to an attribute input; and receiving a plurality of attribute inputs, one attribute input after another, to the attribute user interface control, each attribute input assigning a new value to a corresponding attribute value of the changeable attribute, each attribute input creating a new image state, wherein every time the new image state is created, the user interface control is updated to reflect the creating.

22. The computer program product of claim 20, wherein updating the user interface control to reflect the creating comprises adding a visual representation to the user interface control indicating the new image state.

23. The computer program product of claim 20, wherein the user interface control is a slider including a button located within the slider, the button configured to be located at a plurality of positions within the slider, wherein each position of the button in the slider corresponds to an image state.

24. The computer program product of claim 16, wherein the plurality of modified image states is greater than the image states in the maintained history of image states, and wherein the plurality of modified image states is obtained by interpolating values corresponding to the image states of the maintained history of image states.

25. The computer program product of claim 24, the operations further comprising updating the user interface control such that each position in the updated user interface control corresponds to one of the plurality of modified image states.

26. The computer program product of claim 25, wherein the user interface further comprises a play control button configured such that, when the play control button is selected, the content item is successively displayed in the user interface according to the plurality of modified states, starting from a modified state and proceeding towards a last modified state.

27. The computer program product of claim 16, wherein the plurality of modified states is fewer than the image states in the maintained history of image states, and wherein the plurality of modified states includes image states obtained based on factors including an assignment.

28. The computer program product of claim 27, wherein the assignment is based one or more of a duration for which a content item is viewed or a selection of an image state from the maintained history of image states.

29. The computer program product of claim 16, wherein the content item is an image and the changeable attribute includes one of a brightness, a sharpness, a hue, and a saturation.

30. The computer program product of claim 16, wherein the changeable attribute has a default image state corresponding to a default value, the content item displayed according to the default image state when the content item is first displayed in the display device.

31. A system comprising:

a processor; and a computer-readable medium encoding instructions to cause the processor to perform operations comprising:

displaying a content item having at least one attribute that is changeable in value;

maintaining a history of image states, each image state in the history corresponding to a change in at least one attribute value relative to another image state; and based on the maintained history of image states, generating a plurality of modified image states such that a quantity of modified image states is different from a quantity of image states in the maintained history.

32. The system of claim 31, the operations further comprising storing the maintained history of image states and the modified image states in a computer-readable memory.

33. The system of claim 32, the operations further comprising:

in response to receiving input, displaying the content item according to an image state retrieved from the maintained history of image states, wherein the content item is displayed according to attribute values corresponding to the retrieved image state;

receiving input to change at least one of the attribute values corresponding to the retrieved image state; and erasing the states that are stored in the maintained history of image states subsequent to the retrieved image state, from the computer-readable memory.

34. The system of claim 33, wherein the input comprises skimming.

35. The system of claim 31, the operations further comprising displaying a user interface control related to the image states in the history of image states in the user interface, the user interface control configured to display the content item according to the attribute values corresponding to one of the image states of the history of image states in response to receiving input, wherein the content item is displayed according to attribute values corresponding to the image state according to which the content item is displayed.

36. The system of claim 35, the operations further comprising:

displaying a user interface control panel in the user interface, the user interface control panel including an attribute user interface control configured to change a value of at least one of the attribute values in response to an attribute input; and receiving a plurality of attribute inputs, one attribute input after another, to the attribute user interface control, each attribute input assigning a new value to a corresponding attribute value of the changeable attribute, each attribute input creating a new image state, wherein every time the new image state is created, the user interface control is updated to reflect the creating.

37. The system of claim 35, wherein updating the user interface control to reflect the creating comprises adding a visual representation to the user interface control indicating the new image state.

38. The system of claim 35, wherein the user interface control is a slider including a button located within the slider, the button configured to be located at a plurality of positions within the slider, wherein each position of the button in the slider corresponds to an image state.

39. The system of claim 31, wherein the plurality of modified image states is greater than the image states in the maintained history of image states, and wherein the plurality of modified image states is obtained by interpolating values corresponding to the image states of the maintained history of image states.

40. The system of claim 39, the operations further comprising updating the user interface control such that each position in the updated user interface control corresponds to one of the plurality of modified image states.

41. The system of claim 40, wherein the user interface further comprises a play control button configured such that, when the play control button is selected, the content item is successively displayed in the user interface according to the plurality of modified states, starting from a modified state and proceeding towards a last modified state.

42. The system of claim 31, wherein the plurality of modified states is fewer than the image states in the maintained history of image states, and wherein the plurality of modified states includes image states obtained based on factors including an assignment.

43. The system of claim 42, wherein the assignment is based one or more of a duration for which a content item is viewed or a selection of an image state from the maintained history of image states.

44. The system of claim 31, wherein the content item is an image and the changeable attribute includes one of a brightness, a sharpness, a hue, and a saturation.

45. The system of claim 31, wherein the changeable attribute has a default image state corresponding to a default value, the content item displayed according to the default image state when the content item is first displayed in the display device.

* * * * *